A. A. GOLDSMITH.

BALE-TIE.

No. 7,480. Reissued Jan. 30, 1877.

WITNESSES

Villette Anderson.

Walter C. Masi

INVENTOR

A. A. Goldsmith.

by E. W. Anderson,

ATTORNEY

N. PETERS, PHOTO-LITHOGRAPHER, WASHINGTON, D. C.

UNITED STATES PATENT OFFICE.

ABRAHAM A. GOLDSMITH, OF CHARLESTON, SOUTH CAROLINA.

IMPROVEMENT IN BALE-TIES.

Specification forming part of Letters Patent No. 183,390, dated October 17, 1876; reissue No. 7,480, dated January 30, 1877; application filed December 16, 1876.

*To all whom it may concern:*

Be it known that I, ABRAHAM A. GOLDSMITH, of Charleston, in the county of Charleston and State of South Carolina, have invented a new and valuable Improvement in Bale-Ties; and I do hereby declare that the following is a full, clear, and exact description and operation of the same, reference being had to the annexed drawings, making a part of this specification, and to the letters and figures of reference marked thereon.

Figure 1:
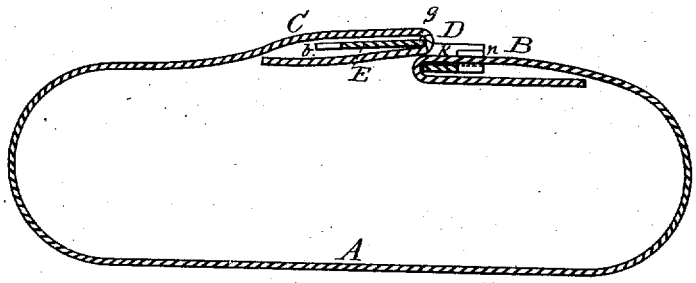
Figure 3:
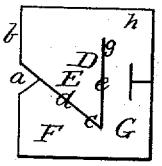
Figure 4:
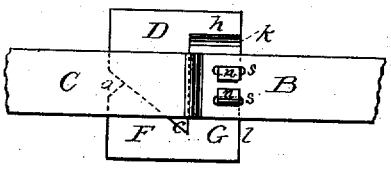
Figure 2:
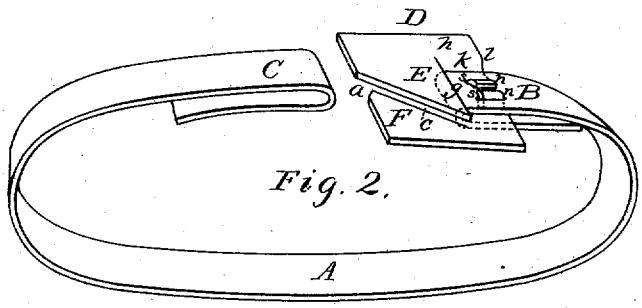

Figure 1 is a sectional view of the band and tie-plate connected. Fig. 2 is a perspective view of the same before binding. Fig. 3 is a plan view of the plate, showing the form of the slits in front and rear. Fig. 4 is a plan view of the tie-plate and the ends of the band connected.

This invention has relation to means for securing the ends of the metallic bands used in baling cotton or hay; and it consists in the construction and novel arrangement of the angular cut or slit running from the front edge of the tie-plate, the angular cross-tongue formed thereby, the guard-piece, and the bar for the looped end of the band depressed below the level of the tongue; also, in the novel formation of lugs bent from the material of the buckle or tie-plate, to enter corresponding perforations in the band, as hereinafter shown and described.

In the accompanying drawings, the letter A designates a metallic band, such as is ordinarily used in baling cotton. B indicates the looped end, which is designed to be attached to the tie before binding. C is the adjustable end, which is fastened to the tie after being carried around the bale. D represents the buckle or tie-plate, which is so constructed that the ends of the band, under the pressure and tension of the inclosed bale, will be in forcible contact at their bends, where they pass around the bars of the plate, and thus secured to said plate by a wedging action. The plate or buckle may be stamped in form out of stout sheet or plate metal. It is usually nearly square, as illustrated in the drawings. A notch, *a*, is made in its front edge *b*, which is the edge toward which the adjustable end of the band is carried. From this notch extends laterally inward the angular cut or slit *c*, whereof the first portion, *d*, is oblique, and the last part, *e*, is parallel with the front and rear edges of the plate. This slit for the main part bounds the tongue E, which therefore has a transverse rear edge, *g*, parallel with the rear edge of the plate. At the heel of the tongue the plate extends to the rear on the level of the tongue, as shown at *h*.

The part F of the plate, which is divided from the tongue by the oblique cut *d*, forms the guard of the tie, and the portion G, which is partly separated by the cut *e* from the rear of the tongue, forms the bar of the tie. Both of these portions are somewhat depressed below the level of the tongue, to enable the end of the band to be introduced. A bend, *k*, connects the depressed bar G with the heel extension *h* of the tongue.

The operation of this tie is as follows: The end B of the band is connected to the bar G of the plate, being looped around the same, riveted or otherwise fastened thereto. The free end of the band is carried around the bale, and, when the latter is compressed, bent around under the tongue D, the bend of the band passing through the slit *e*, and engaging with the rear edge of said tongue. When thus connected the guard F will prevent the end of the tie from slipping off laterally, and the expansion and tension of the bale, when released from the compress, will forcibly wedge together the bends of the tie in the slit *e*, firmly securing the same to the plate.

In order to avoid riveting the end B of the band to the bar G of the plate, angular cuts may be made in the metal at the rear edge *l* of the plate, forming lugs or projections *n* when bent outward, which serve to enter perforations *s* of the band, and may be secured, after passing through the same, by bending their ends down against the metal of the band, as indicated in the drawings. These front and rear notches of the plate are covered by the ends of the band when in use, so that they cannot be readily manipulated.

I am aware that it is not new to form an entrance-slit in the front bar of a tie-plate, or to depress one branch of the plate below the other for convenience in attaching the band; hence, I do not claim, broadly, such invention.

What I claim, and desire to secure by Letters Patent, is—

1. In combination with the bent ends of metallic bands, a slit tie-plate, substantially as described, through which the said ends are passed, and by which the outer surfaces of the bends thereof are wedged against each other by the expansive force of the bale, substantially as specified.

2. The tie-plate D, having the angular cross-tongue E, rear bar G, depressed at the bend *k*, and guard F, separated from said cross-tongue by the angular slit *c*, opening at the front of the plate, and joined to the depressed rear bar G, substantially as specified.

3. The tie-plate having the angular cross-tongue E, partly separated by the slit-opening at *a* in front, and the fastening-lugs *n*, cut from the material of the plate in rear, substantially as specified.

In testimony that I claim the foregoing I have hereunto set my hand this 5th day of December, 1876.

A. A. GOLDSMITH.

Witnesses:

JOHN R. HERIOT,
D. B. DUPONT.